US008860970B2

(12) United States Patent
Kuroyanagi

(10) Patent No.: US 8,860,970 B2
(45) Date of Patent: Oct. 14, 2014

(54) IMAGE PROCESSING APPARATUS, IMAGE PROCESSING METHOD, AND COMPUTER-READABLE MEDIUM

(71) Applicant: Tomohiro Kuroyanagi, Kanagawa (JP)

(72) Inventor: Tomohiro Kuroyanagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 85 days.

(21) Appl. No.: 13/630,191

(22) Filed: Sep. 28, 2012

(65) Prior Publication Data

US 2013/0100475 A1 Apr. 25, 2013

(30) Foreign Application Priority Data

Oct. 21, 2011 (JP) ................................. 2011-232257

(51) Int. Cl.
*G06F 15/00* (2006.01)
*H04N 1/00* (2006.01)
*H04N 1/23* (2006.01)

(52) U.S. Cl.
CPC ....... *H04N 1/00453* (2013.01); *H04N 1/00435* (2013.01); *H04N 1/00503* (2013.01); *H04N 1/00482* (2013.01); *H04N 1/00811* (2013.01); *H04N 1/00411* (2013.01); *H04N 1/00474* (2013.01); *H04N 1/00424* (2013.01); *H04N 2201/0094* (2013.01); *H04N 1/2338* (2013.01); *H04N 1/00464* (2013.01)
USPC .......... 358/1.13; 358/1.9; 358/1.14; 358/1.15

(58) Field of Classification Search
None
See application file for complete search history.

(56) References Cited

U.S. PATENT DOCUMENTS 7,576,877 B2 * 8/2009 Tanaka et al. ................. 358/1.14
7,843,578 B2 11/2010 Nonaka et al.
(Continued)

FOREIGN PATENT DOCUMENTS

| JP | 2006-203874 | 8/2006 |
| JP | 2007-235384 | 9/2007 |
| JP | 2010-114825 | 5/2010 |

OTHER PUBLICATIONS

David Kappos, Subject Matter Eligibility of Computer Readable Media, US Patent and Trademark Office, Feb. 23, 2010, 1351 OG 212.*

*Primary Examiner* — King Poon
*Assistant Examiner* — Ted Barnes
(74) *Attorney, Agent, or Firm* — Harness, Dickey & Pierce, P.L.C.

(57) ABSTRACT

An image processing apparatus includes a screen information storage unit configured to store screen information of a home screen that displays a user interface component list including an application user interface component for accessing an application, a screen generating unit configured to generate the home screen based on the screen information, a display unit configured to display the home screen generated by the home screen generating unit, an image generation control unit configured to issue an instruction to generate a general-purpose image of a document when a request for scanning the document is issued while the home screen is displayed, and an image processing unit configured to generate the general-purpose image based on image data obtained from scanning the document upon receiving the instruction to generate the general-purpose image from the image generation control unit.

8 Claims, 16 Drawing Sheets

(56) References Cited

U.S. PATENT DOCUMENTS

| | | |
|---|---|---|
| 2005/0007616 A1* | 1/2005 | Sugiyama et al. ............ 358/1.13 |
| 2006/0077411 A1* | 4/2006 | Mathieson et al. .......... 358/1.13 |
| 2007/0201060 A1 | 8/2007 | Fukuda |
| 2007/0297022 A1* | 12/2007 | Nakatsuka .................... 358/474 |
| 2008/0106772 A1* | 5/2008 | Ko ................................ 358/474 |
| 2010/0085600 A1* | 4/2010 | Nozaki ......................... 358/1.15 |
| 2010/0122187 A1 | 5/2010 | Kunori et al. |
| 2010/0165381 A1* | 7/2010 | Wu et al. ...................... 358/1.15 |
| 2011/0199629 A1* | 8/2011 | Sensu et al. .................. 358/1.13 |
| 2011/0199639 A1* | 8/2011 | Tani et al. .................... 358/1.15 |
| 2011/0235130 A1* | 9/2011 | Okada .......................... 358/442 |
| 2011/0279363 A1* | 11/2011 | Shoji et al. ................... 345/156 |
| 2011/0317193 A1* | 12/2011 | Iwase et al. .................. 358/1.13 |
| 2012/0013928 A1* | 1/2012 | Yoshida et al. .............. 358/1.13 |
| 2012/0019863 A1* | 1/2012 | Sensu et al. .................. 358/1.15 |
| 2012/0023451 A1 | 1/2012 | Kuroyanagi |
| 2012/0050776 A1* | 3/2012 | Fukumoto et al. ........... 358/1.13 |
| 2012/0050800 A1* | 3/2012 | Maruyama et al. .......... 358/1.15 |
| 2012/0050807 A1* | 3/2012 | Noda et al. ................... 358/1.15 |
| 2012/0099128 A1* | 4/2012 | Yoshida et al. .............. 358/1.13 |
| 2012/0099130 A1* | 4/2012 | Tohki et al. .................. 358/1.13 |
| 2012/0212761 A1* | 8/2012 | Kuroyanagi .................. 358/1.13 |
| 2012/0262737 A1* | 10/2012 | Beegle et al. ................. 358/1.9 |
| 2012/0268771 A1* | 10/2012 | Kruizinga et al. ............ 358/1.14 |

* cited by examiner

FIG.3
| ICON ID | ICON IMAGE DATA |
|---|---|
| ID0001 |  |
| ID0002 |  |
| ID0003 |  |
| ... | ... |
| ID1011 |  |

FIG.4

| PLACEMENT ID | COORDINATES | ICON ID | DISPLAY OWNER ID | SETTING VALUE NUMBER | URL NUMBER |
|---|---|---|---|---|---|
| 001 | (10, 200) | ID0001 | 0001 (COPY APPLICATION) | — | — |
| 002 | (190, 200) | ID0002 | 0002 (SCANNER APPLICATION) | — | — |
| 003 | (370, 200) | ID0003 | 0003 (PRINTER APPLICATION) | — | — |
| 004 | (550, 200) | ID0004 | 0002 (SCANNER APPLICATION) | 3 | — |
| 005 | (730, 200) | ID0005 | 1001 (TYPE C:SDK COPY APPLICATION) | — | — |
| 006 | (10, 300) | ID0103 | 2001 (TYPE J:SDK SIMPLE SCANNER APPLICATION) | — | — |
| 007 | (190, 300) | ID0104 | 0001 (COPY APPLICATION) | 2 | — |
| 008 | (370, 300) | ID0104 | 0001 (COPY APPLICATION) | 3 | — |
| 009 | (550, 300) | ID1011 | 0050 (WEB BROWSER) | — | 1 |
| 010 | (730, 300) | ID1011 | 0050 (WEB BROWSER) | — | 2 |
| ... | ... | ... | ... | ... | ... |

FIG.5

| SETTING VALUE NUMBER | REGISTERED NAME | SETTING VALUE | | | | | | | | |
|---|---|---|---|---|---|---|---|---|---|---|
| | | COLOR | PAPER TRAY | ORIGINAL TYPE | ORIGINAL ORIENTATION | DENSITY | DUPLEX/ COMBINE/ DIVIDE | MAGNIFICATION | FINISHING |
| 1 | COMBINE PRINTING | FULL COLOR | A4 HORIZONTAL | PHOTOGRAPH | READABLE ORIENTATION | NORMAL | COMBINE | 71% | SORT |
| 2 | BLACK & WHITE COPYING | BLACK & WHITE | A3 VERTICAL | COPIED DOCUMENT | UNREADABLE ORIENTATION | NORMAL | — | — | SORT |
| 3 | DUPLEX A4 COPYING | FULL COLOR | A4 HORIZONTAL | COPIED DOCUMENT | READABLE ORIENTATION | NORMAL | DUPLEX | — | STAPLE |
| ... | ... | | | | | | | | |
| 9 | <UNREGISTERED> | — | — | — | — | — | — | — | — |
| 10 | <UNREGISTERED> | — | — | — | — | — | — | — | — |

FIG.6

| URL NUMBER | REGISTERED NAME | URL |
|---|---|---|
| 1 | AAA HOMEPAGE | http://www.AAA.co.jp/ |
| 2 | BBB HOMEPAGE | http://www.BBB.co.jp/ |
| ... | ... | ... |
| 9 | <UNREGISTERED> | – |
| 10 | <UNREGISTERED> | – |

| PLACEMENT ID | COORDINATES | ICON ID | DISPLAY OWNER ID | SETTING VALUE NUMBER | URL NUMBER | DISPLAY STATUS |
|---|---|---|---|---|---|---|
| 001 | (10, 200) | ID0001 | 0001 (COPY APPLICATION) | – | – | DISPLAYED |
| 002 | (190, 200) | ID0002 | 0002 (SCANNER APPLICATION) | – | – | DISPLAYED |
| 003 | (370, 200) | ID0004 | 0002 (SCANNER APPLICATION) | 5 | – | DISPLAYED |
| 004 | (550, 200) | ID0004 | 0002 (SCANNER APPLICATION) | 3 | – | DISPLAYED |
| 005 | (730, 200) | ID1011 | 0050 (WEB BROWSER) | – | 1 | DISPLAYED |
| 006 | (10, 300) | ID0103 | 0001 (COPY APPLICATION) | 7 | – | DISPLAYED |
| 007 | (190, 300) | ID1011 | 0050 (WEB BROWSER) | – | 2 | DISPLAYED |
| 008 | (370, 300) | ID0104 | 0001 (COPY APPLICATION) | 3 | – | DISPLAYED |
| 009 | (550, 300) | ID1011 | 0050 (WEB BROWSER) | – | 3 | DISPLAYED |

→

402

| PLACEMENT ID | COORDINATES | ICON ID | DISPLAY OWNER ID | SETTING VALUE NUMBER | URL NUMBER | DISPLAY STATUS |
|---|---|---|---|---|---|---|
| 001 | (5, 200) | ID0001 | 0001 (COPY APPLICATION) | – | – | DISPLAYED |
| 002 | (175, 200) | ID0002 | 0002 (SCANNER APPLICATION) | – | – | DISPLAYED |
| 003 | (250, 200) | ID0004 | 0002 (SCANNER APPLICATION) | 5 | – | DISPLAYED |
| 004 | (5, 300) | ID0004 | 0002 (SCANNER APPLICATION) | 3 | – | DISPLAYED |
| 005 | (175, 300) | ID0103 | 0001 (COPY APPLICATION) | 7 | – | DISPLAYED |
| 006 | (250, 300) | ID0104 | 0001 (COPY APPLICATION) | 3 | – | DISPLAYED |
| 007 | (5, 200) | – | – | – | – | NOT DISPLAYED |
| 008 | (175, 200) | – | – | – | – | NOT DISPLAYED |
| 009 | (250, 200) | – | – | – | – | NOT DISPLAYED |

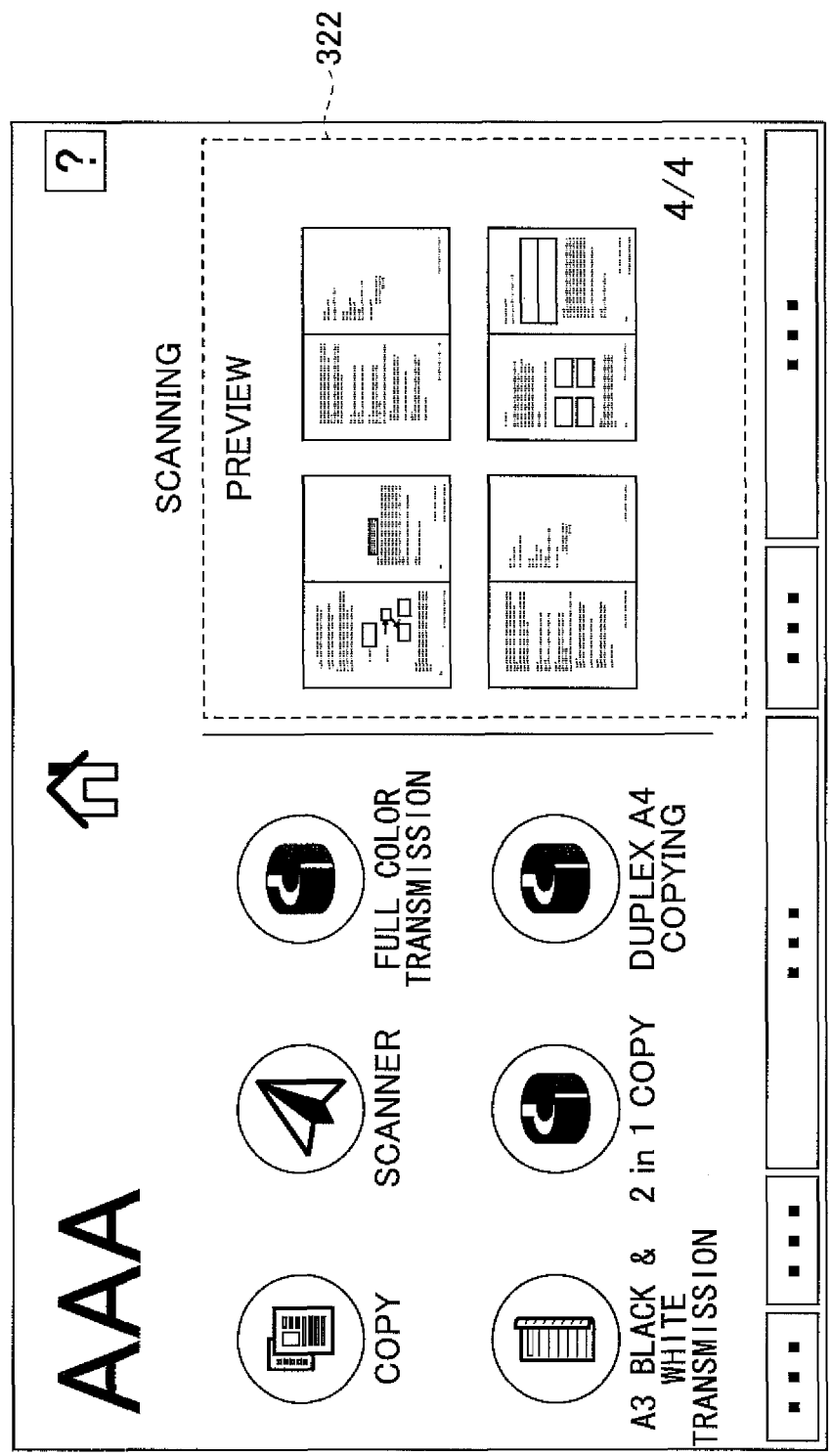

IMAGE PROCESSING APPARATUS, IMAGE PROCESSING METHOD, AND COMPUTER-READABLE MEDIUM

BACKGROUND OF THE INVENTION

1. Field of the Invention

The disclosures herein generally relate to an image processing apparatus, an image processing method, and a computer-readable medium storing a program for executing the image processing method.

2. Description of the Related Art

Presently, technologies are developing for enhancing the multi-functionality of the multifunction peripheral (MFP) using a Software Development Kit (SDK) to install functions such as an application added by a third vendor or a web browsing function in addition to standard applications such as copy, scan, fax, and print applications.

Also, the MFP has a macro function for accessing pre-registered setting values (e.g., A4 size, black & white, combine, staple) of an application (e.g., copy application).

A technique is known for enabling the MFP to display a shortcut icon for accessing the pre-registered macro setting values (e.g., A4 size, black & white, combine, staple) of an application to provide a user interface with high operability.

For example, Japanese Laid-Open Patent No. 2010-114825 discloses a user interface that displays a portal button that enables access to registered information on a top screen in order to improve operability.

Also, a technique is known for enabling the MFP to start scanning a document before the output destination and various image settings are specified and to perform image editing operations on the document image later.

For example, Japanese Laid-Open Patent No. 2006-203874 discloses an image forming apparatus that starts scanning an image of a document when the document is set, and performs image processing after setting values are specified and a start command is input. Also, Japanese Laid-Open Patent No. 2007-235384 discloses a technique for enabling reuse of an image and converting an image format according to the output destination.

It is noted that in the above disclosed techniques, the function for scanning an image beforehand is enabled via an operation screen of the corresponding application. However, the function cannot be enabled via a home screen displaying a list of shortcut icons for accessing various applications. That is, before activating the function for scanning a document image, a user operation is required to switch the display from the home screen to the operation screen of the corresponding application. Thus, further measures are desired for improving the operability of the image processing apparatus.

SUMMARY OF THE INVENTION

It is a general object of at least one embodiment of the present invention to provide an image processing apparatus and an image processing method that substantially obviate one or more problems caused by the limitations and disadvantages of the related art.

One object of the present invention is to provide a technique for enabling a document to be scanned while the home screen is displayed to thereby improve usability of an image processing apparatus.

In one embodiment, an image processing apparatus includes a screen information storage unit configured to store screen information of a home screen that displays a user interface component list including an application user interface component for accessing an application, a screen generating unit configured to generate the home screen based on the screen information, a display unit configured to display the home screen generated by the home screen generating unit, an image generation control unit configured to issue an instruction to generate a general-purpose image of a document when a request for scanning the document is issued while the home screen is displayed, and an image processing unit configured to generate the general-purpose image based on image data obtained by scanning the document upon receiving the instruction to generate the general-purpose image from the image generation control unit.

According to an aspect of the present invention, by enabling a document to be scanned while the home screen is displayed, usability of the image processing apparatus may be improved.

BRIEF DESCRIPTION OF THE DRAWINGS

Other objects and further features of embodiments will be apparent from the following detailed description when read in conjunction with the accompanying drawings, in which:

FIG. 3 is a table showing an exemplary data structure of icon image information used in the present embodiment;

FIG. 4 is a table showing an exemplary data structure of normal icon placement information used in the present embodiment;

FIG. 5 is a table showing an exemplary structure of setting value information of a copy application of the image processing apparatus according to the present embodiment;

FIG. 6 is a table showing an exemplary structure of URL information used in the present embodiment;

FIG. 12 is a diagram illustrating the generation of job execution icon placement information used in the present embodiment;

FIG. 16 is a diagram showing an exemplary job execution screen that displays plural thumbnail images.

DESCRIPTION OF THE PREFERRED EMBODIMENTS

Embodiments of the present invention are described below with reference to the accompanying drawings.

[First Embodiment]

In the following, an image processing apparatus according to a first embodiment of the present invention is described.

<Hardware Configuration>

Figure 1:
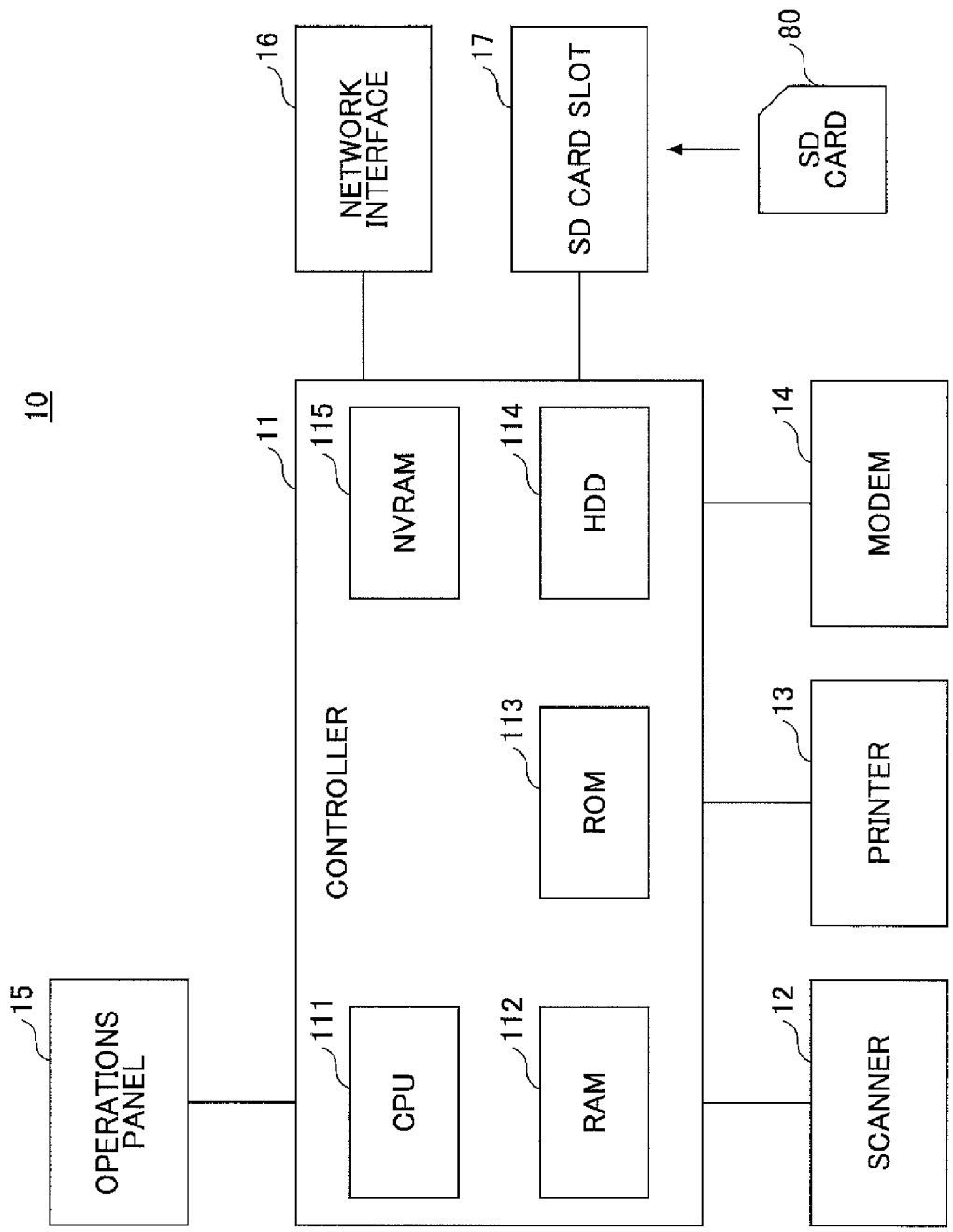
FIG. 1 is a block diagram showing an exemplary hardware configuration of an image processing apparatus according to a first embodiment of the present invention.

FIG. 1 is a block diagram showing an exemplary hardware configuration of an image processing apparatus according to the first embodiment of the present invention. In FIG. 1, an image processing apparatus 10 includes a controller 11, a scanner 12, a printer 13, a modem 14, an operations panel 15, a network interface 16, and a SD card slot 17. The image processing apparatus 10 may be a MFP, for example.

The controller 11 includes a CPU (Central Processing Unit) 111, a RAM (Random Access Memory) 112, a ROM (Read-Only Memory) 113, a HDD (Hard Disk Drive) 114, and a NVRAM (Non-Volatile RAM) 115.

The ROM 113 stores programs and data used by the programs. The RAM 112 is used as a storage area in which programs may be loaded and a work area for the loaded programs.

The CPU 111 enables various functions by processing the programs loaded on the RAM 112. The HDD 114 stores programs and data used by the programs. The NVRAM 115 stores various types of setting information, for example.

The scanner 12 is configured to scan and obtain image data of a document. The printer 13 is configured to print data on a print sheet. The modem 14 is configured to establish connection through a telephone line to enable facsimile transmission and reception of image data.

The operations panel 15 includes an input unit such as a button for accepting a user input and a display unit such as a liquid crystal panel. The network interface 16 is configured to establish connection with a wired or wireless network such as a LAN (Local Area Network).

The SD card slot 17 is used to read a program stored in an SD card 80. In the image processing apparatus 10 of the present embodiment, a program stored in the SD card 80 may be loaded on the RAM 112 and executed in addition to the programs stored in the ROM 113.

In other embodiments, the SD card 80 may be replaced by another type of storage medium (e.g., CD-ROM or USB memory). In this case, the SD card slot 17 may be replaced by a drive unit for the corresponding storage medium.

<Functional Configuration>

Figure 2:
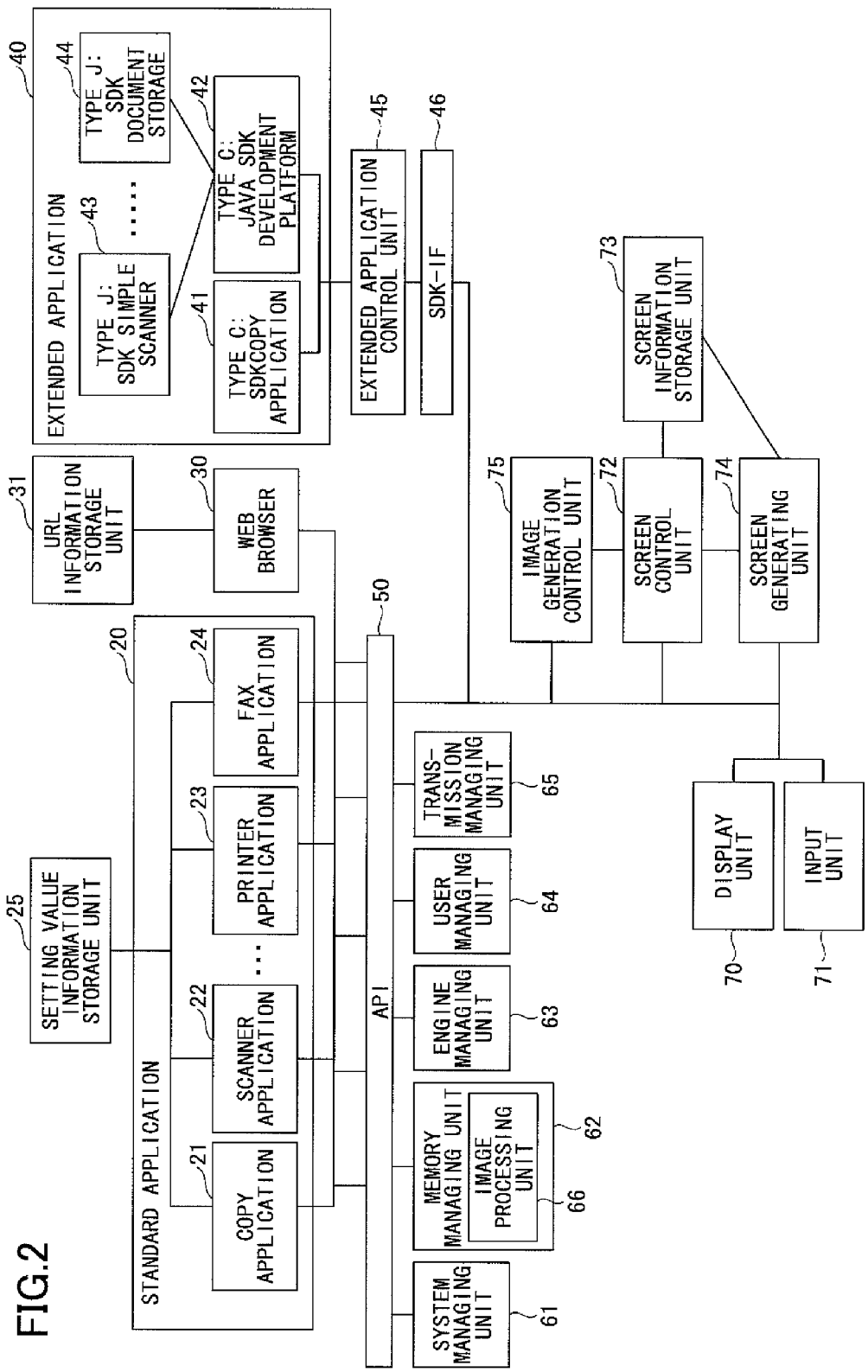
FIG. 2 is a block diagram showing an exemplary functional configuration of the image processing apparatus according to the present embodiment.

FIG. 2 is a block diagram showing an exemplary functional configuration of the image processing apparatus 10. The image processing apparatus 10 includes a standard application 20, a setting value information storage unit 25, a web browser 30, a URL information storage unit 31, an extended application 40, an extended application control unit 45, a SDK-IF 46, an API (Application Program Interface) 50, a system managing unit 61, a memory managing unit 62, an engine managing unit 63, a user managing unit 64, a transmission managing unit 65, a display unit 70, an input unit 71, a screen control unit 72, a screen information storage unit 73, a screen generating unit 74, and an image generation control unit 75.

The standard application 20 includes applications that are normally installed in the image processing apparatus 10 such as a copy application 21, a scanner application 22, a printer application 23, and a fax application 24, for example.

The standard application 20 generates operation screens, executes application jobs, and registers or accesses setting values in the setting value information storage unit 25. It is noted that one or more setting values that are registered in an application beforehand is referred to as a "macro" and a function for accessing the macro is referred to as a "macro function." The standard application 20 uses the API 50 to output data to the display unit 70.

The setting value information storage unit 25 stores pre-registered setting values of the standard application 20.

The web browser 30 establishes communication with an HTTP server to display a web page. The web browser 30 obtains URL information from the URL information storage unit 31 and outputs a corresponding URL web page to the display unit 70. The URL information storage unit 31 stores URL information of the URL web page to be displayed by the browser 30.

The extended application 40 includes applications that may be added using the SDK (Software Development Kit) such as a SDK copy application 41, a Java SDK development platform 42, a SDK simple scanner 43, and a SDK document storage 44, for example. The extended application 40 may generate an operation screen and execute an application job. It is noted that a SDK application that is developed using the C language is referred to as "Type C" and a SDK application developed using Java (registered trademark) is referred to as "Type J."

The SDK copy application 41 is a Type C SDK application developed using the C language.

The Java SDK development platform 42 is a Type C SDK application developed using the C language. The Java SDK development platform 42 is a Java VM platform for enabling installation of an SDK application developed using Java (registered trademark).

The SDK simple scanner 43 is a Type J SDK application developed using Java (registered trademark).

The SDK document storage 44 is a Type J SDK application that is developed using Java (registered trademark).

The extended application control unit 45 directly controls Type C SDK applications. However, Type J SDK applications are installed in the Java SDK development platform 42, which is a Type C SDK application, and the extended application control unit 45 controls the Type J SDK applications via the Java SDK development platform 42.

The system managing unit 61 is configured to manage the overall system. The system managing unit 61 may prompt an application to display an operation screen by issuing a corresponding display request, for example. The memory managing unit 62 manages memory and generates file data.

The memory managing unit 62 includes an image processing unit 66. Upon receiving an image processing request from the image generation control unit 75, the image processing unit 66 generates an image from the image data obtained from scanning a document. The image generated by the image processing unit 66 may be a general-purpose image, for example. It is noted that a general-purpose image refers to an image that may be edited later by designating one or more setting values. The general-purpose image may be an image with the maximum specifications that can be accommodated by the image processing apparatus 10 such as an image in full-color with the maximum resolution. The image processing unit 66 may also generate a preview image from the general-purpose image according to the setting values of a corresponding application. Further, the image processing unit 66 may manage the generated images.

The engine managing unit 63 controls the document scanning operations. The user managing unit 64 performs user authentication and manages the scanner transmission destination, for example. The transmission managing unit 65 controls data transmission from the image processing apparatus 10 to other apparatuses.

The display unit 70 displays a screen generated by the screen generating unit 74 such as a home screen or a job execution screen. The home screen displays a list of shortcut icons (also referred to as "icon" hereinafter) that may include icons for the standard application 20, a macro icon, a web page icon, and icons for the extended application 40, for example. The shortcut icon is a user interface component for accessing an application, a web page, or a macro.

The job execution screen may display a list of icons for relevant applications and a preview image of an image generated beforehand, for example. It is noted that the job execution screen does not have to include the list of icons.

The display unit 70 may display an operation screen of the standard application 20, an operation screen of the extended application 40, or a web page output by the web browser 30, for example.

The input unit 71 detects when an icon displayed on the home screen is pressed. The input unit 71 accepts the pressing of the icon as an operation request input for the corresponding icon. The input unit 71 may also accept inputs from the operation screens of the standard application 20 and the extended application 40 and inputs from a web page, for example.

The screen control unit 72 performs control operations related to the home screen. The screen control unit 72 sends a request to the image generation control unit 75 to generate a general-purpose image and a preview image of the general-purpose image when a button for scanning a document is pressed while the home screen is displayed. The screen control unit 72 also sends a request to the screen generating unit 74 to switch the screen.

Also, when the macro icon is pressed, the screen control unit 72 determines whether document scanning operations have started. Based on the determination result, the screen control unit 72 determines whether to request the generation of a preview image or to request the display of the operation screen of an application.

The screen information storage unit 73 stores icon image information and icon placement information of the icons displayed in the home screen. The icon placement information includes normal icon placement information and job execution icon placement information. The icon image information and the icon placement information are screen information of the home screen, which is described below.

The normal icon placement information corresponds to information indicating the layout of icons within the home screen. The job execution icon placement information corresponds to information indicating the layout of icons and a preview image within a job execution screen.

Upon receiving a home screen generation request from the screen control unit 72, the screen generating unit 74 generates a home screen based on the icon image information and the normal icon placement information obtained from the screen information storage unit 73.

Upon receiving a screen switch request from the screen control unit 72, the screen generating unit 74 generates a job execution screen including a preview image based on the job execution icon placement information obtained from the screen information storage unit 73.

The image generation control unit 75 controls operations for generating the general-purpose image. For example, upon receiving a request to generate a general-purpose image and a preview image from the screen control unit 72, the image generation control unit 75 sends a request to the image processing unit 66 to generate the images.

The extended application control unit 45 controls operations of the extended application 40. It is noted that conventionally, a dedicated screen for extended applications is displayed by an extended application control unit. However, in the present embodiment, such a dedicated screen is not displayed by the extended application control unit 45. In the present embodiment, the screen control unit 72 manages and controls screen transitions for switching applications including the standard application 20, the extended application 40, and the web browser 30.

It is noted that the standard application 20, the web browser 30, the extended application 40, the system managing unit 61, the memory managing unit 62, the engine managing unit 63, the user managing unit 64, the transmission managing unit 65, the screen control unit 72, the screen generating unit 74, the image generation control unit 75, and the extended application control unit 45 may be realized by the CPU 111, the RAM 112 including a work memory, and the HDD 114 that stores various programs, for example. Also, the setting information storage unit 25, the URL information storage unit 31, and the screen information storage unit 73 may be realized by the ROM 113, for example. The display unit 70 and the input unit 71 may be realized by the operations panel 15, for example.

<Data Structure>

In the following, data structures of data used in the present embodiment are described. The screen information storage unit 73 stores icon image information and icon placement information.

FIG. 3 is a table showing an exemplary data structure of the icon image information. The icon image information shown in FIG. 3 associates an icon ID with icon image data. The icon image data may include image data that is registered beforehand and image data that is added later. When icon image data is newly added, an icon ID may automatically be assigned to the newly added image data by the screen control unit 72, for example.

FIG. 4 is a table showing an exemplary data structure of the normal icon placement information. The normal icon placement information shown in FIG. 4 associates a placement ID for an icon with home screen coordinates of the icon, an icon ID of the icon image data, a display owner ID for identifying the application displaying the icon, the setting value number of a macro if applicable (i.e., if the icon is for a standard application 20 with a pre-registered setting), and a URL number if the icon is for the web browser 30.

In the case of newly installing an extended application 40, the screen control unit 72 may create a new placement ID by incrementing the value of the maximum placement ID currently used and assign the new placement ID to the new extended application 40. Also, coordinates of an open position within the home screen may be added to the normal icon placement information as the home screen coordinates of the new extended application 40. Further, a new ID that is pre-assigned to the new extended application 40 may be added to the normal icon placement information as the display owner ID of the new extended application 40.

As for the icon ID of the new extended application 40, if an icon image is provided by the new extended application 40, a new icon ID may be created by incrementing the value of the maximum icon ID currently used and the new icon ID may be assigned to the new extended application 40. In this case, the icon image information may be updated as well. If an icon is not provided by the new extended application 40, a system default icon ID may be assigned to the new extended application 40.

As is shown in FIG. 4, in the present embodiment, icons of the standard application 20 and the extended application 40 are displayed on the same screen. For example, the icon of the scanner application 22 as the standard application 20 with the placement ID "004" and the icon of the SDK copy application 41 as the extended application 40 with the placement ID "005" may be displayed on the same screen. Also, in the present embodiment different icons may be displayed for activating the same application if the application has different macro setting values. For example, an icon for the copy application 21 with the placement ID "007" and an icon for the copy application 21 with the placement ID "008" may be displayed on the same screen.

In the following, macro setting values of the standard application 20 that are stored in the setting value information storage unit 25 are described.

FIG. 5 is a table showing an exemplary structure of the setting value information of the copy application 21. The setting value information shown in FIG. 5 associates a setting value number for a macro function with a corresponding registered name and setting values that are registered by a user beforehand. It is noted that the setting value number of FIG. 5 corresponds to the setting value number included in the normal icon placement information for the home screen (see FIG. 4).

For example, regarding the macro function identified by the setting value number "1" in FIG. 5, the registered name of the macro function is "Combine Printing," the setting value for color is "Full Color," the setting value for paper tray is "A4 Horizontal," the setting value for original type is "Photograph," and the setting value for original orientation is "Readable Orientation," the setting value for density is "Normal," the setting value for duplex/combine/divide is "Combine," the setting value for magnification is "71%," and the setting value for finishing is "Sort."

In the following, the URL information stored in the URL information storage unit 31 is described.

FIG. 6 is a table showing an exemplary structure of the URL information. In FIG. 6, the URL information associates a URL number with a corresponding registered name and URL that are registered by a user beforehand. It is noted that the URL number of FIG. 6 corresponds to the URL number included in the normal icon placement information for the home screen (see FIG. 4).

For example, in FIG. 6, the URL number "1" is associated with the registered name "AAA Homepage" and the URL "http://www.AAA.co.jp."

<Home Screen & Screen Transitions>

In the following, examples of the home screen and basic screen transitions from the home screen are described.

Figure 7:
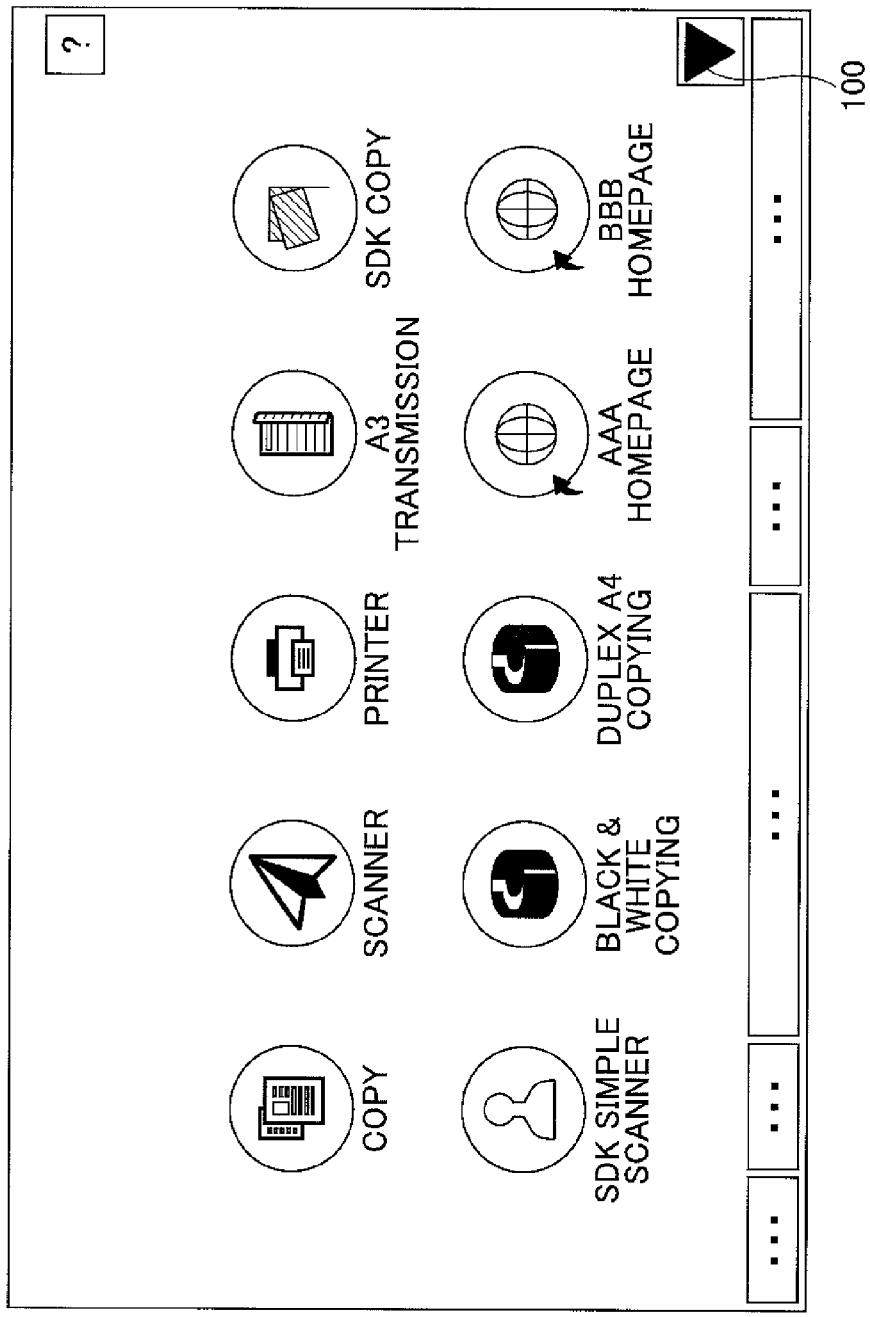
FIG. 7 is a diagram showing an exemplary home screen displayed by the image processing apparatus according to the present embodiment.

FIG. 7 is a diagram showing an exemplary home screen. In FIG. 7, shortcut icons for the standard application 20 (i.e., copy application, scanner application, and printer application), the extended application 40 (i.e., Type C SDK copy application, and Type J SDK simple scanner application), macros of the standard application 20 (i.e., A3 transmission of the scanner application, black & white copying of the copy application, and duplex A4 copying of the copy application), and the URLs of the web browser 30 (i.e., AAA homepage and BBB homepage) are displayed within the same screen.

When an icon within the home screen shown in FIG. 7 is pressed, an operation screen of the corresponding application, a web page, or an operation screen of the corresponding application with the corresponding macro may be displayed, for example. In the case where the icons cannot be accommodated within one screen, a next page button 100 at the lower right corner of FIG. 7 may be pressed so that the screen may be switched to display the next page.

In the following, examples of basic screen transitions from the home screen are described.

Figure 8:
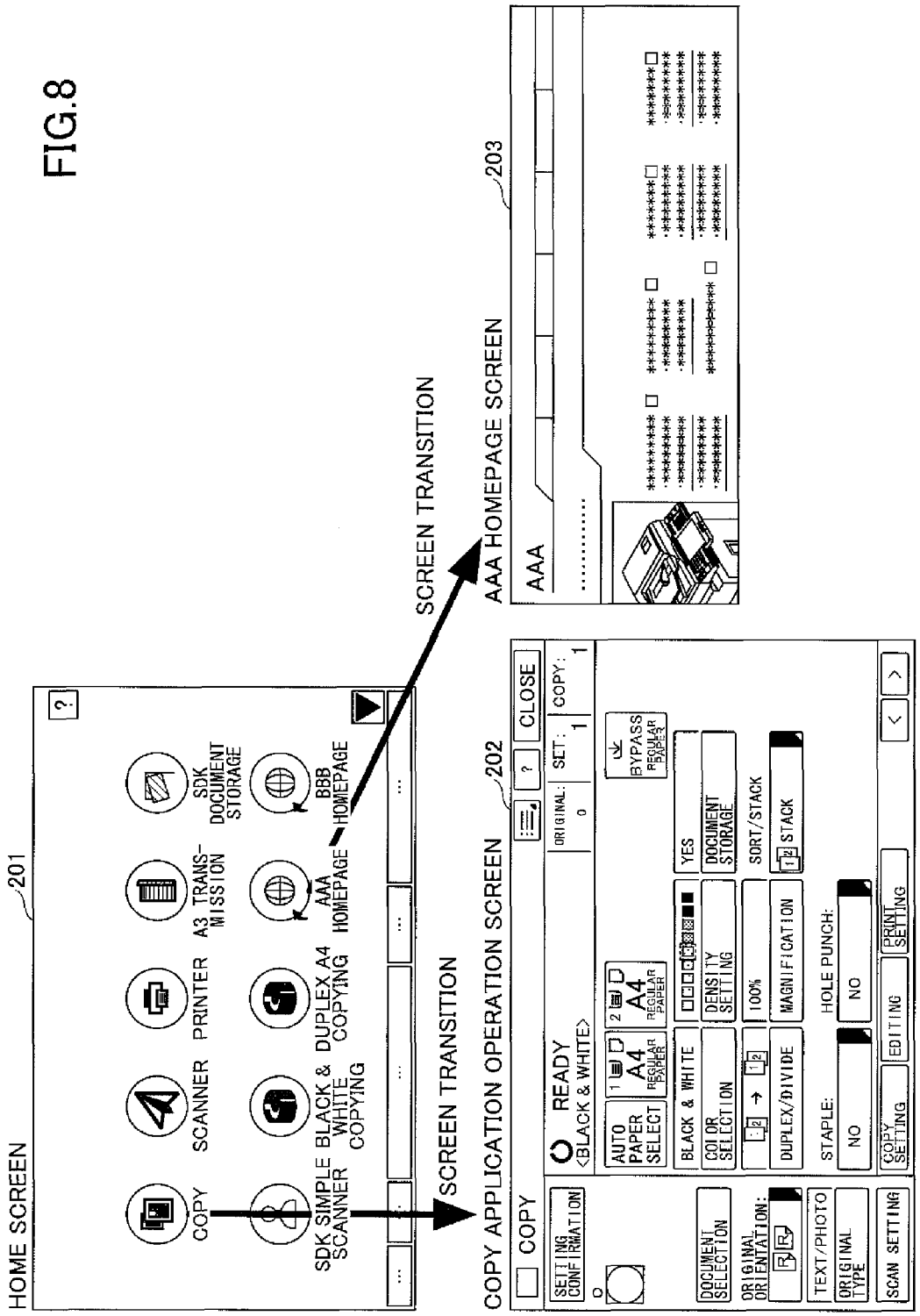
FIG. 8 is a diagram showing exemplary screen transitions of the image processing apparatus according to the present embodiment.

FIG. 8 is a diagram showing exemplary screen transitions. As is shown in FIG. 8, when the copy icon at the upper left corner of a home screen 201 is pressed, a copy application screen 202 may be displayed. When an icon for the AAA homepage at the lower left side of the home screen 201 is pressed, an AAA homepage screen 203 may be displayed. In this example, the display screen may be switched from the home screen 201 showing a list of icons for various applications to a screen of the selected function with one user operation (i.e., pressing the icon) so that the burden on the user may be reduced. It is noted that the screen transition may be controlled by the screen control unit 72.

<<Home Screen Display Operations>>

In the following, operations of the image processing apparatus 10 for displaying a home screen are described.

Figure 9:
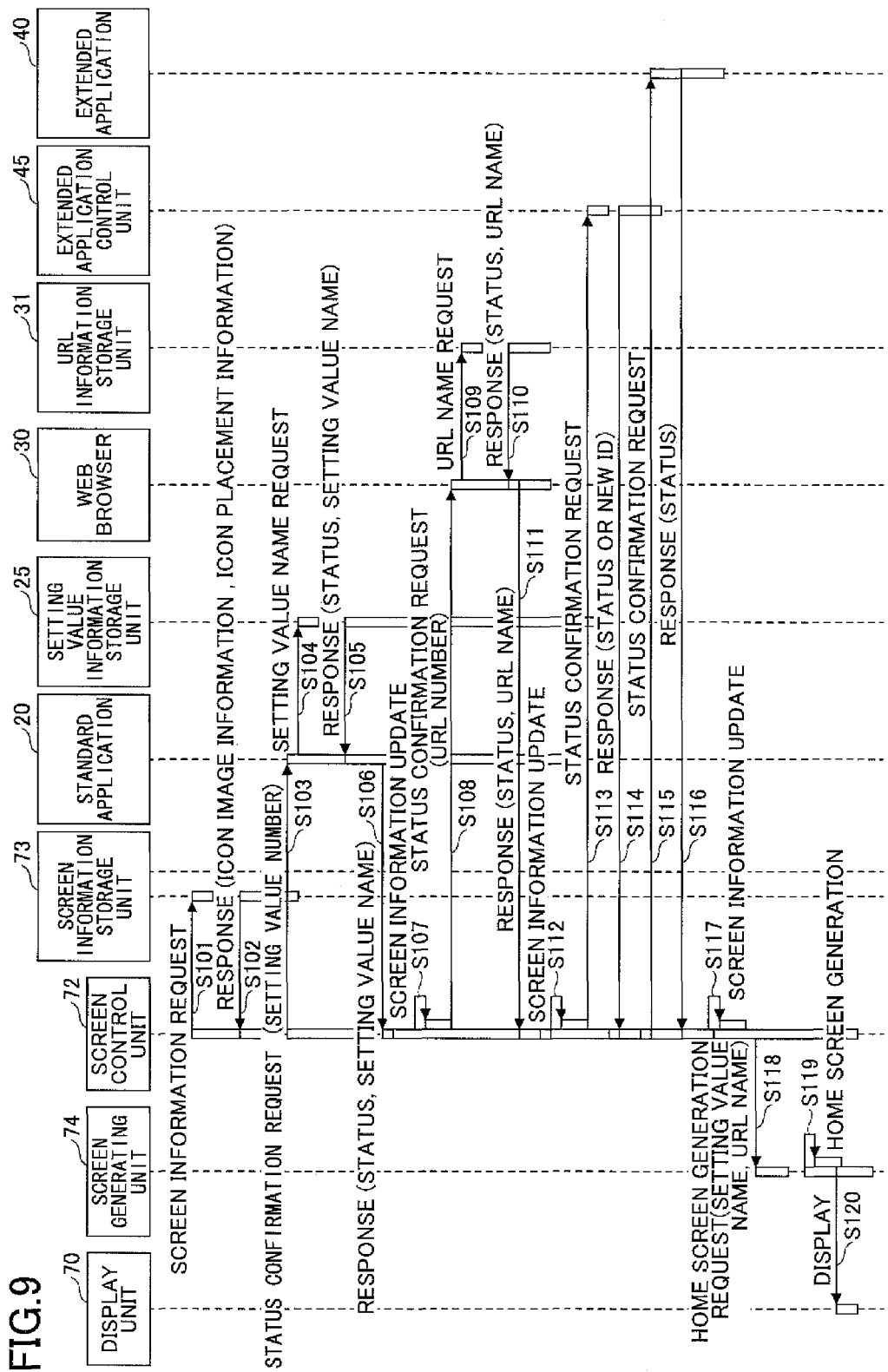
FIG. 9 is a sequence chart showing exemplary process steps for displaying the home screen.

FIG. 9 is a sequence chart showing exemplary process steps for displaying a home screen.

(Obtaining Screen Information)

In step S101 of FIG. 9, in response to a predetermined trigger, the screen control unit 72 sends a request to the screen information storage unit 73 to obtain screen information. The predetermined trigger may be the startup of the image processing apparatus 10 or a command input via the input unit 71 to display the home screen, for example.

In step S102, the screen control unit 72 obtains icon placement information and icon image information from the screen information storage unit 73. Then, based on the icon placement information, the screen control unit 72 confirms the status of each owner module on a placement ID basis or on an application function basis as is described below.

(Standard Application Status Confirmation)

In step S103, the screen control unit 72 sends a status confirmation request to the standard application 20 using the setting value number as a parameter.

In step S104, the standard application 20 sends a request to the setting value information storage unit 25 to obtain the corresponding setting value name.

In step S105, the standard application 20 obtains the setting value name from the setting value information storage unit 25 using the setting value number as a key. It is noted that when the setting value information storage unit 25 does not include the setting value number used as the key, the standard application 20 determines that the corresponding macro function is not available for execution. When the setting value name for the setting value number is obtained, the standard application 20 determines that the corresponding macro function is available for execution.

In step S106, the screen control unit 72 obtains information on the availability of the setting value information and the setting value name from the standard application 20.

In step S107, the screen control unit 72 updates the icon placement information based on the information obtained in step S106. For example, when the setting value information storage unit 25 does not include the setting value number used as the key, the screen control unit 72 may delete the corresponding setting value information from the icon placement information. It is noted that when all of the setting value information is available, the screen control unit 72 does not have to update the icon placement information.

(Web Browser Status Confirmation)

In step S108, the screen control unit 72 sends a status confirmation request to the web browser 30 using the URL number as a parameter.

In step S109, the web browser 30 sends a request to the URL information storage unit 31 to obtain the corresponding URL name.

In step S110, the web browser 30 obtains the URL name from the URL information storage unit 31. It is noted that when the URL information storage unit 31 does not include the URL information corresponding to the URL number, the screen control unit 72 determines that the URL is unavailable. When the URL name corresponding to the URL number is obtained, the screen control unit 72 determines that the corresponding URL is available.

In step S111, the screen control unit 72 obtains information on the availability of the URL and the URL name from the web browser 30.

In step S112, the screen control unit 72 updates the icon placement information based on the information obtained in step S111. For example, if the URL is unavailable, the screen control unit 72 may delete the URL from the icon placement information.

(Extended Application Status Confirmation)

In step S113, the screen control unit 72 sends a request to the extended application control unit 45 to check the installation status of the extended application 40.

In step S114, in the case where there is a new extended application 40 that has been newly installed, the screen control unit 72 obtains the display owner ID of the new extended application 40 and adds the obtained display owner ID to the icon placement information. Also, in the case where the new extended application 40 has icon image data, the screen control unit 72 obtains the icon image data of the new extended application 40 via the extended application control unit 45 and adds the obtained icon image data to the icon image information.

In step S115, the screen control unit 72 sends a status confirmation request to the extended application 40.

In step S116, the screen control unit 72 obtains information on the availability of the extended application 40 from the extended application 40. It is noted that the extended application 40 would be unavailable if it has been uninstalled, for example.

In step S117, the screen control unit 72 updates the icon placement information based on the information obtained in step S116. For example, if the extended application 40 is unavailable, the screen control unit 72 may delete information on the corresponding extended application 40 from the icon placement information. If the extended application 40 has been newly installed, the screen control unit 72 may add information on the new extended application 40 to the icon placement information.

(Home Screen Generation)

In step S118, the screen control unit 72 sends a request to the screen generating unit 74 to generate a home screen.

In step S119, the screen generating unit 74 generates a home screen based on the status confirmation information obtained and the icon placement information. In the present embodiment, the screen generating unit 74 places the setting value name or the URL name under the corresponding icon displayed in the home screen.

In step S120, the screen generating unit 74 outputs the generated home screen to the display unit 70. In turn, the display unit 70 displays the generated home screen.

It is noted that the setting value name and the URL name may vary depending on the registration statuses of the storage units so that the screen control unit 72 is configured to obtain the setting value name and the URL name upon generating the home screen. On the other hand, in the present embodiment, it is assumed that standard application names (e.g., copy, scanner, printer, and fax) and extended application names (e.g., SDK copy and SDK simple scanner) are determined and registered beforehand.

In this way, a home screen including a list of icons for applications, macro functions, and web pages may be displayed. In the present embodiment, document scanning operations may be started while such a home screen is displayed as is described below.

<Document Scanning from Home Screen>

In the following, operations are described for scanning a document while the home screen is displayed. In the present embodiment, document scanning operations may be enabled without switching a display from the home screen to an operation screen of an application so that user operations may be reduced and usability may be improved, for example.

<<Screen Transitions when Starting Scanning Job from Home Screen>>

Figure 10:
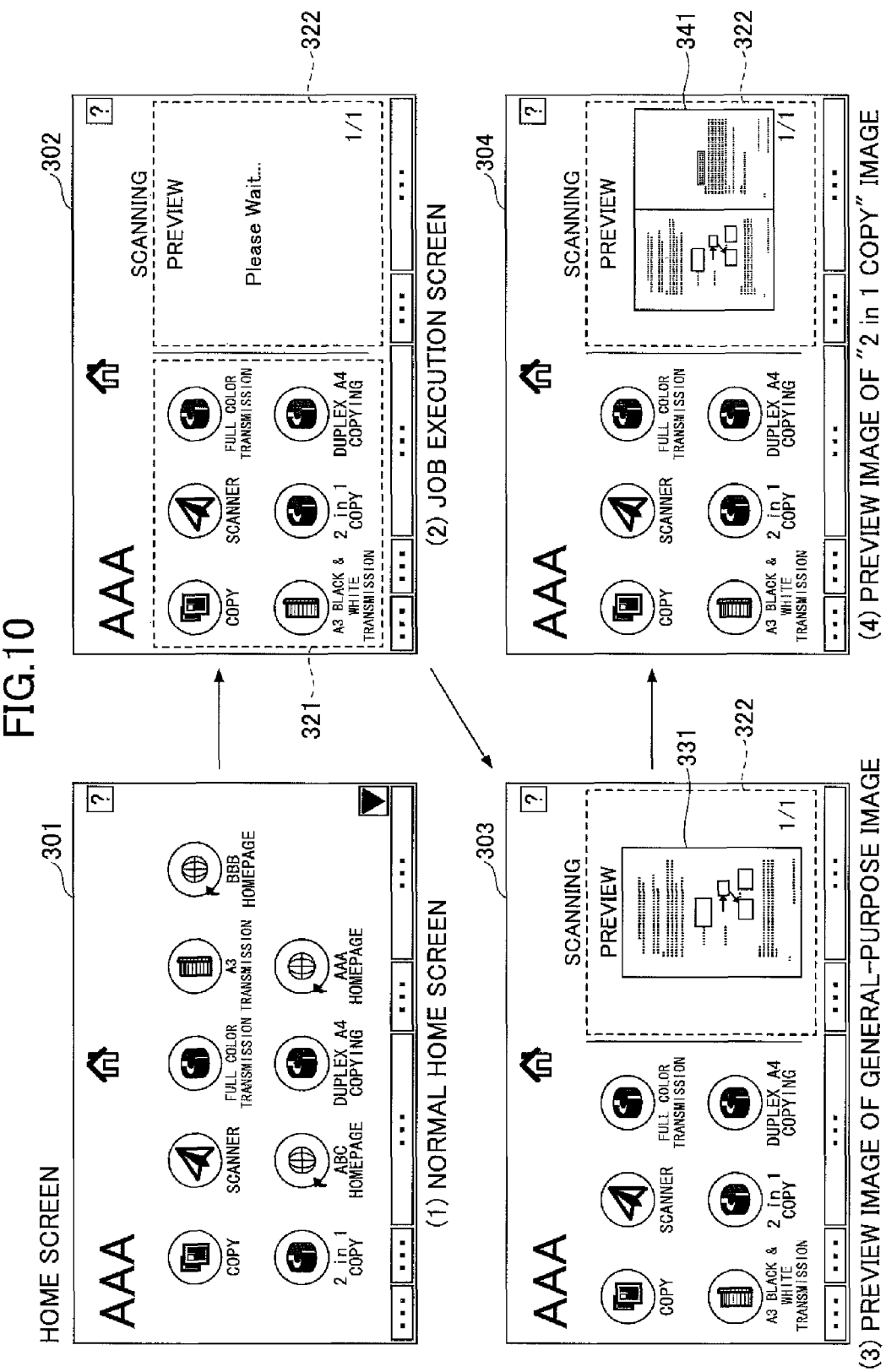
FIG. 10 is a diagram showing exemplary screen transitions in the case where a scanning job is started while the home screen is displayed.

When a scanning job is started from the home screen, the display screen may change in the manner shown in FIG. 10, for example.

FIG. 10 is a diagram showing exemplary screen transitions in the case where a scanning job is started while the home screen is displayed.

(1) Normal Home Screen

First, a document may be set while a normal home screen 301 is displayed, and a button for prompting document scanning operations (e.g., start button) may be pressed. The pressing of the button detected by the input unit 71 indicates the start of the document scanning job.

(2) Job Execution Screen

When the scanning job is started, the screen control unit 72 performs control operations so that the display is switched from the home screen 301 to a job execution screen 302. The job execution screen 302 includes a region 321 for displaying icons related to the scanning job and a region 322 for displaying a preview image. It is noted that icons for web pages that are unrelated to the scanning job are excluded from the display in the region 321. In the job execution screen 302, generation of a general-purpose image is not yet completed, and the region 322 displays the message "Please Wait . . . " It is noted that the job execution screen 302 is generated by the screen generating unit 74.

(3) Preview Image of General-Purpose Image

When the generation of the general-purpose image is completed, the screen generating unit 74 generates an updated job execution screen 303 that displays a preview image 331 of the general-purpose image in region 322. In this way, the user may easily check how the document has been scanned without pressing a preview button, for example.

(4) Preview Image of "2 in 1 Copy" Image

When a "2 in 1 Copy" icon is pressed and selected, the image processing unit 66 generates a preview image 341 of an edited image resulting from applying the "2 in 1 Copy" setting to the copy application 21. The screen generating unit 74 generates an updated job execution screen 304 that displays the preview image 341 in region 322. In this way, a user may easily check the editing result from executing the "2 in 1 Copy" application through one user operation.

<<Job Execution Screen>>

Figure 11:
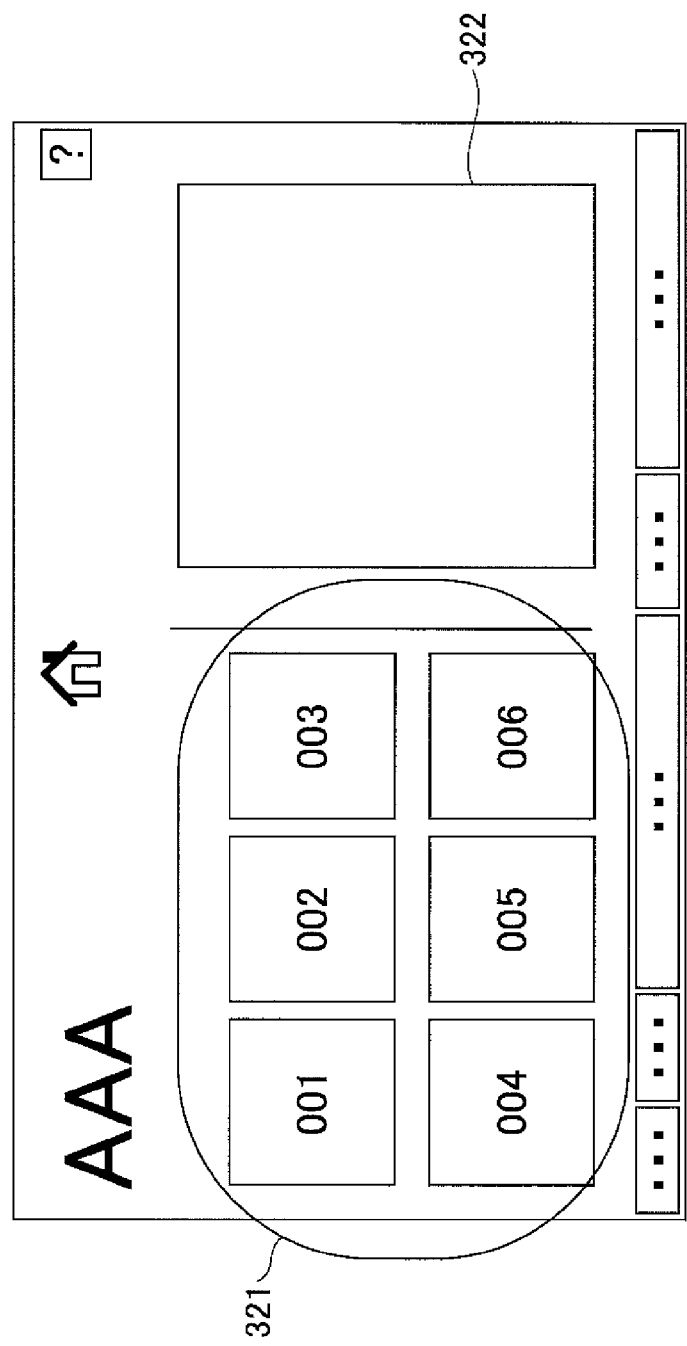
FIG. 11 is a diagram showing an exemplary layout of a job execution screen displayed by the image processing apparatus according to the present embodiment.

FIG. 11 is a diagram showing an exemplary layout of a job execution screen. In FIG. 11, the job execution screen includes the region 321 for displaying icons and the region 322 for displaying a preview image. It is noted that the layout information for the job execution screen may be stored in the screen information storage unit 73 as the job execution icon placement information.

In the present embodiment, the screen generating unit 74 arranges relevant icons for the job execution screen to be displayed in chronological order at positions 001-006 of the region 321.

In the following, operations of the screen generating unit 74 are described for generating job execution icon placement information from the normal icon placement information.

FIG. 12 is a diagram illustrating the generation of the job execution icon placement information. In the present embodiment, the screen generating unit 74 generates job execution icon placement information 402 from normal icon placement information 401 shown in FIG. 12. In this process, icons associated with the placement IDs "005," "007," and "009" of the normal icon placement information 401 are determined to be irrelevant to the scanning job and are deleted.

The screen generating unit 74 enters the remaining icons that have not been deleted from the normal icon placement information 401 to the job execution icon placement information in chronological order. In this way, the job execution icon placement information 402 of FIG. 12 is generated.

Based on the job execution icon placement information, the screen generating unit 74 arranges the icons in the region 321. Also, the screen generating unit 74 arranges a preview image generated by the image processing unit 66 in the region 322. In this way, the job execution screen as is shown in FIG. 11 may be generated.

<<Job Execution Screen Display Operations>>

In the following, operations of the image processing apparatus 10 for displaying the job execution screen are described.

Figure 13:
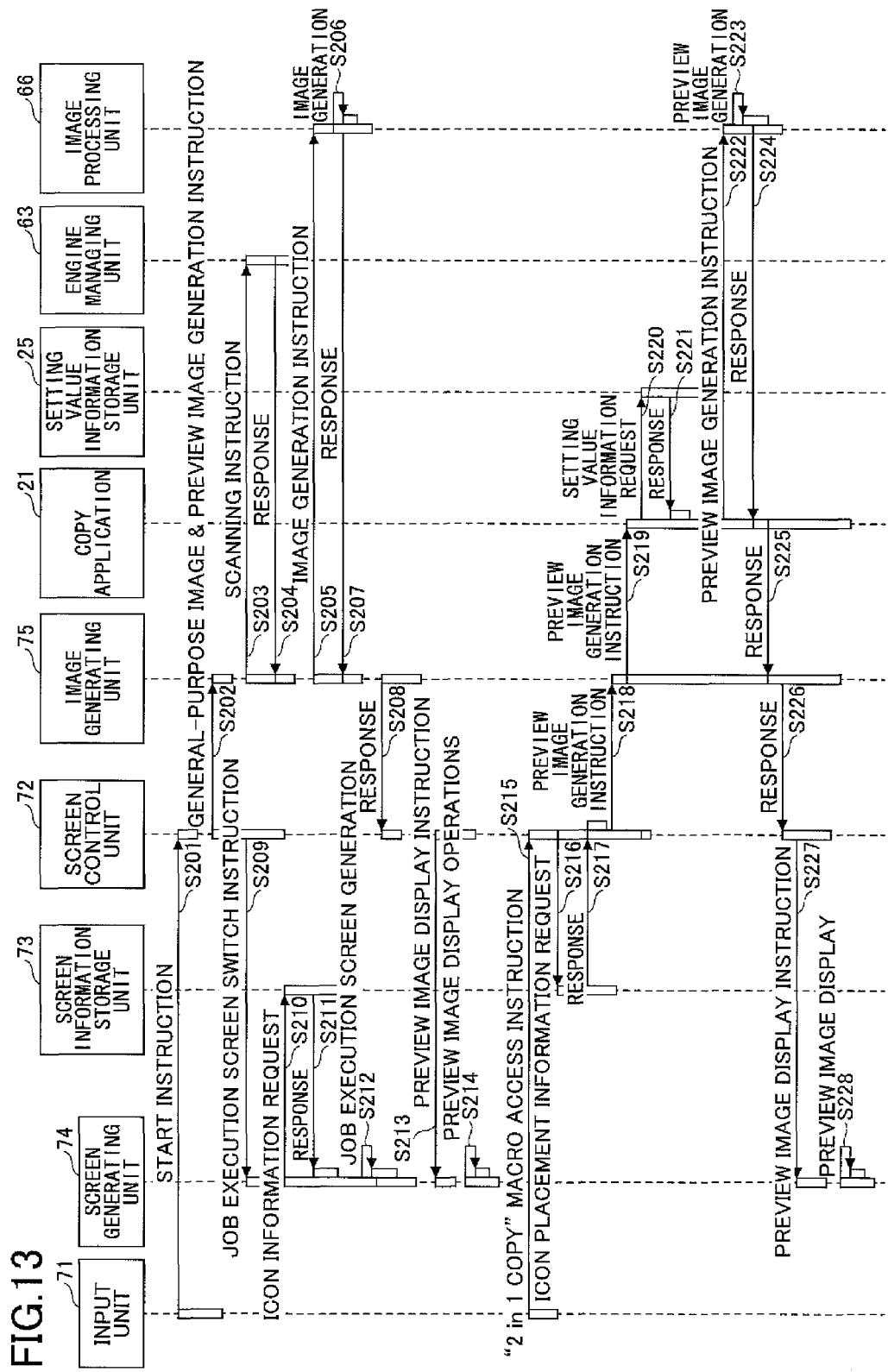
FIG. 13 is a sequence chart showing exemplary process steps of the image processing apparatus of the present embodiment for realizing the screen transitions shown in FIG. 10.

FIG. 13 is a sequence chart showing exemplary process steps of the image processing apparatus 10 for realizing the screen transitions shown in FIG. 10.

(Initial Job Execution Screen)

In step S201, when a document is set while the home screen is displayed and a start button is pressed, the input unit 71 may detect the pressing of the start button as a request for scanning the document and instruct the screen control unit 72 to start the scanning job.

In step S202, upon receiving the instruction to start the scanning job, the screen control unit 72 instructs the image generation control unit 75 to generate a general-purpose image and a preview image.

In step S203, upon receiving the image generation request from the screen control unit 72, the image generation control unit 75 instructs the engine managing unit 63 to scan the document.

In step S204, the engine managing unit 63 controls the scanner 12 to scan the document and generate image data of the document. The document image data (scan data) is stored in the memory managing unit 62. When the generation of the document image data is completed, the engine managing unit 63 sends a response to the image generation control unit 75 notifying the completion of the image data generating operation.

In step S205, the image generation control unit 75 instructs the image processing unit 66 to generate a general-purpose image.

In step S206, upon receiving the instruction to generate the general-purpose image from the image generation control unit 75, the image processing unit 66 generates the general-purpose image from the document image data. As described above, the general-purpose image may be an editable image having the maximum specifications that can be accommodated by the image processing apparatus 10. The image processing unit 66 also generates a preview image of the general-purpose image.

In step S207, when the generation of the general-purpose image and the preview image is completed, the image processing unit 66 sends a response to the image generation control unit 75 notifying the completion of the image generating operation.

In step S208, the image generation control unit 75 sends a response to the screen control unit 72 notifying the completion of the image generating operation.

In parallel with step S202, the screen control unit 72 may send an instruction to the screen generating unit 74 to switch the display from the home screen to a job execution screen in step S209.

In step S210, the screen generating unit 74 sends a request to the screen information storage unit 73 to obtain the job execution icon placement information.

In step S211, the screen generating unit 74 obtains the job execution icon placement information from the screen information storage unit 73. It is noted that the screen generating unit 74 extracts icons that are relevant to the scanning job based on the display owner ID of the normal icon placement information. That is, the screen generating unit 74 excludes icons for web pages that are irrelevant to the scanning job. The screen generating unit 74 enters information of the extracted icons in the job execution icon placement information (see job execution icon placement information 402 of FIG. 12).

In step S212, the screen generating unit 74 arranges the icons within the region 321 of the job execution screen based on the job execution icon placement information. In the case where the preview image is still being generated, the screen generating unit 74 displays a message such as "Please Wait . . . " within the region 322 of the job execution screen (see FIG. 10).

(Preview Image)

In step S213, the screen control unit 72 instructs the screen generating unit 74 to display a preview image.

In step S214, the screen generating unit 74 arranges the preview image within the region 322 of the job execution screen to display the preview image within the job execution screen (see FIG. 10).

In one preferred embodiment, the exchange of image information may be preformed using IDs and the image itself may be obtained by sending an inquiry to the memory managing unit 62.

("2 in 1 Copy" Preview Image)

In step S215, upon detecting the pressing of the "2 in 1 Copy" macro displayed in the home screen, the input unit 71 instructs the screen control unit 72 to access the "2 in 1 Copy" macro.

In step S216, the screen control unit 72 requests the screen information storage unit 73 to obtain the icon placement information of the "2 in 1 Copy" macro.

In step S217, the screen control unit 72 obtains the icon placement information from the screen information storage unit 73.

In step S218, the screen control unit 72 determines the display owner ID and the setting value number of the icon placement information, and instructs the image generation control unit 75 to generate a preview image.

In step S219, the image generation control unit 75 identifies the copy application 21 as the display owner based on the display owner ID, notifies the copy application 21 of the setting value number, and requests the copy application 21 to obtain the setting values of the macro identified by the setting value number.

In step S220, the copy application 21 sends a request to the setting value information storage unit 25 to obtain the setting values of the macro identified by the setting value number.

In step S221, the copy application 21 obtains the setting values of the macro from the setting value information storage unit 25.

In step S222, the copy application 21, notifies the image processing unit 66 of the setting values obtained in step S221 and instructs the image processing unit 66 to generate a corresponding preview image.

In step S223, the image processing unit 66 edits the general-purpose image using the setting values obtained from the copy application 21 and generates a preview image of the edited image resulting from applying the macro.

In step S224, the image processing unit 66 sends a response including an ID of the generated preview image to the copy application 21.

In step S225, the copy application 21 sends a response to the image generation control unit 75 notifying the completion of the image generating operation.

In step S226, the image generation control unit 75 sends a response including the ID of the generated preview image to the screen control unit 72.

In step S227, the screen control unit 72 notifies the screen generating unit 74 of the preview image ID and instructs the screen generating unit 74 to display the preview image.

In step S228, the screen generating unit 74 obtains the preview image from the memory managing unit 66 using the preview image ID obtained from the screen control unit 72 and arranges the preview image in the region 322 of the job execution screen. In this way, the preview image of the edited image resulting from applying the macro may be displayed in the job execution screen as is shown in FIG. 10, for example.

<<Screen Control Unit Instruction Determining Operations>>

In the following, operations of the screen control unit 72 for determining the type of instruction to be issued are described.

Figure 14:
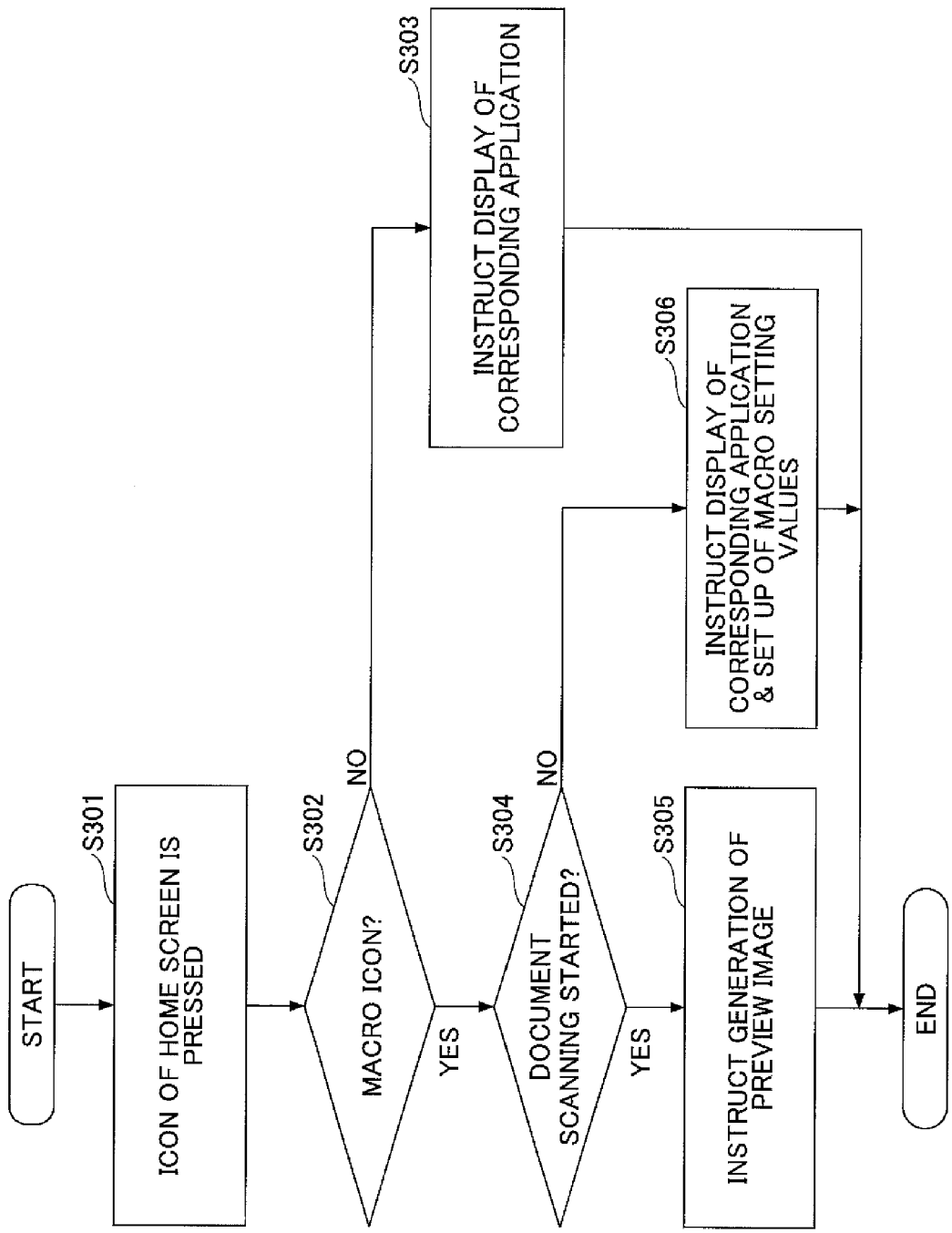
FIG. 14 is a flowchart showing exemplary process steps of a screen control unit for determining the type of instruction to be issued.

FIG. 14 is a flowchart showing exemplary process steps of the screen control unit 72 for determining the type of instruction to be issued. In FIG. 14, the screen control unit 72 changes the instruction it issues depending on whether the icon that has been pressed is an icon for an application or an icon for a macro. Also, in the case where an icon for a macro is pressed, the screen control unit 72 changes the instruction depending on whether document scanning operations have started.

In step S301, the screen control unit 72 receives notification from the input unit 71 that an icon displayed in the home screen has been pressed.

In step S302, the screen control unit 72 determines whether the pressed icon corresponds to an icon for a macro of an application (macro icon) by referring to the corresponding icon placement information obtained from the screen information storage unit 73.

If the pressed icon corresponds to a macro icon (YES in step S302), the process proceeds to step S304. If the pressed icon does not correspond to a macro icon (NO in step S302), the process proceeds to step S303.

In step S303, the screen control unit 72 instructs the application corresponding to the display owner of the pressed icon to display a corresponding operation screen of the application.

It is noted that when the display owner of the pressed icon is the web browser 30, the screen control unit 72 instructs the web browser 30 to display the corresponding web page.

In step S304, the screen control unit 72 sends an inquiry to the engine managing unit 63 to determine whether document scanning operations by the scanner 12 have started. If the document scanning operations have already started (YES in step S304), the process proceeds to step S305. If the document scanning operations have not yet started (NO in step S304), the process proceeds to step S306.

In step S305, the screen control unit 72 instructs the image generation control unit 75 to generate a preview image of the edited image resulting from applying the macro corresponding to the pressed icon.

In step S306, the screen control unit 72 instructs the application corresponding to the display owner of the pressed icon to set up the setting values of the macro in the operation screen and display the resulting operation screen.

As can be appreciated, in the present embodiment, the screen control unit 72 may issue an instruction for displaying an operation screen having the macro setting values set up or an instruction for displaying a preview image of the edited image resulting from applying the macro depending on whether document scanning operations have started.

<<Cancelling Operations>>

In the following, cancelling operations that are performed when a cancel button is pressed while the job execution screen is displayed are described.

Figure 15:
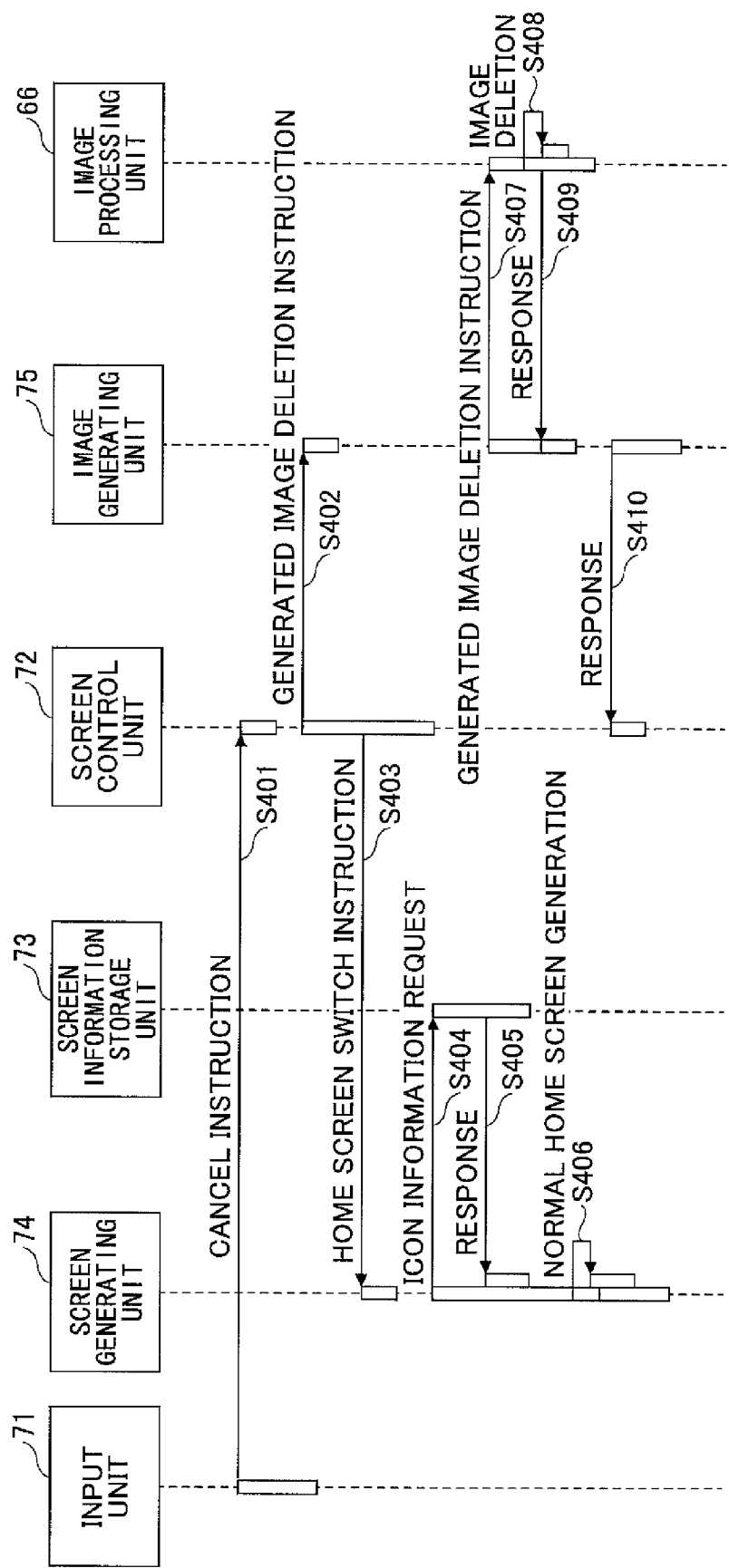
FIG. 15 is a sequence chart showing exemplary process steps for cancelling a job in the present embodiment.

FIG. 15 is a sequence chart showing exemplary process steps for cancelling a job according to the present embodiment.

In step S401, upon detecting that the cancel button has been pressed while the job execution screen is displayed, the input unit 71 sends a cancelling instruction to the screen control unit 72.

In step S402, the screen control unit 72 instructs the image generation control unit 75 to delete the generated general-purpose image and preview image.

In step S403, the screen control unit 72 instructs the screen generating unit 74 to switch the display to the home screen.

In step S404, the screen generating unit 74 sends a request to the screen information storage unit 73 to obtain the normal icon placement information.

In step S405, the screen generating unit 74 obtains the normal icon placement information from the screen information storage unit 73.

In step S406, the screen generating unit 74 generates the home screen based on the normal icon placement information. In this way, the home screen may be displayed on the operations panel 15.

In step S407, the image generation control unit 75 instructs the image processing unit 66 to delete the generated general-purpose image and preview image.

In step S408, the image processing unit 66 deletes the generated general-purpose image and preview image.

In step S409, the image processing unit 66 sends a response to the image generation control unit 75 notifying the deletion of the generated images.

In step S410, the image generating unit 75 sends a response to the screen control unit 72 notifying the deletion of the generated images. It is noted that steps S403-406 and steps S402, S407-410 may be performed in parallel.

According to an aspect of the present embodiment, a job may be cancelled without switching to the operation screen of an application so that usability of the image processing apparatus 10 may be improved.

<Displaying Plural Preview Images>

In the following, operations for displaying plural images are described in a case where plural documents are scanned while the home screen is displayed. Such operations may be performed when plural documents are set and the start button is pressed while the home screen is displayed, for example.

In this case, the image processing unit 66 generates plural general-purpose images based on the images of the plural documents. The image processing unit 66 also generates reduced images from the general-purpose images as preview images.

When the reduced images are generated, the screen generating unit 74 generates a job execution screen including the plural reduced images. The display unit 70 may then display the job execution screen with the plural reduced images. In this way, plural images may be displayed at once as thumbnail images within the job execution screen.

FIG. 16 is a diagram showing an exemplary job execution screen that displays plural reduced images as thumbnail images. In FIG. 16, plural reduced images are displayed in the region 322. By enabling plural images to be displayed within one screen, previewing of the images may be facilitated, for example.

According to an aspect of the present embodiment, one or more documents may be scanned while the home screen is displayed so that usability of the image processing apparatus may be improved.

[Modified Embodiments]

In one embodiment, a computer program executed by an image processing apparatus according to an embodiment of the present invention may be stored in a computer-readable medium such as a CD-ROM, a flexible disk, a CD-R, or a DVD, in a computer-executable and computer-installable file format.

In another embodiment, a computer program executed by an image processing apparatus according to an embodiment of the present invention may be stored in a computer that is connected to a network such as the Internet so that the computer program may be downloaded from the computer via the network.

In another embodiment, a computer program executed by an image processing apparatus according to an embodiment of the present invention may be pre-installed in a ROM, for example.

In one preferred embodiment, a computer program executed by an image processing apparatus according to an embodiment of the present invention may be arranged into a modular configuration with modules for accomplishing the various functional units of the image processing apparatus 10 described above. In terms of hardware, one or more of these functional units may be accomplished by the CPU 111 reading one or more programs from the HDD 114 and loading the programs onto the RAM 112 to execute the programs, for example.

Further, the present invention is not limited to these embodiments, and numerous variations and modifications may be made without departing from the scope of the present invention.

The present application is based on and claims the benefit of the priority date of Japanese Patent Application No. 2011-232257 filed on Oct. 21, 2011, with the Japanese Patent Office, the entire contents of which are hereby incorporated by reference.

What is claimed is:

1. An image processing apparatus comprising:
a screen information storage unit configured to store screen information of a home screen that displays a user interface component list including an application user interface component for accessing an application;
a screen generating unit configured to generate the home screen based on the screen information;
a display unit configured to display the home screen generated by the screen generating unit;
an image generation control unit configured to issue an instruction to generate a general-purpose image of a document when a request for scanning the document is issued while the home screen is displayed;
an image processing unit configured to generate the general-purpose image based on image data obtained from scanning the document upon receiving the instruction to generate the general-purpose image from the image generation control unit; and
a screen control unit configured to determine whether the scanning of the document has started;
wherein the user interface component list includes a macro user interface component for accessing a macro that includes a setting value pre-registered in the application;
wherein the screen control unit determines whether the scanning of the document has started when the macro user interface component is selected;
wherein when the screen control unit determines that the scanning of the document has started an image generating unit generates a macro review image from the general-purpose image, the macro preview image representing an edited image resulting from applying the setting value of the macro; and
wherein when the screen control unit determines that the scanning of the document has not started, the display unit displays an. operation screen of the application that designates the setting value of the macro.

2. The image processing apparatus as claimed in claim 1, wherein
the image processing unit generates a preview image of the general-purpose image;
the screen generating unit generates a job execution screen including the preview image; and
the display unit displays the job execution screen including the preview image.

3. The image processing apparatus as claimed in claim 2, wherein
the screen generating unit identifies a relevant user interface component that is relevant to the general -purpose image and includes the relevant user interface component in the job execution screen.

4. The image processing apparatus as claimed in claim 3, wherein
the user interface component list includes a macro user interface component for accessing a macro that includes a setting value pre-registered in the application; and
when the macro user interface component is selected while the job execution screen is displayed, the image processing unit generates a macro preview image from the general-purpose image, the macro preview image representing an edited image resulting from applying the setting value of the macro.

5. The image processing apparatus as claimed in claim 1, wherein
when an instruction is issued to cancel a job related to the general-purpose image, the screen control unit sends a request to the image generation control unit to delete the general-purpose image and instructs the screen generating unit to generate the home screen.

6. The image processing apparatus as claimed in claim 1, wherein
when the request for scanning the document is for scanning at least two documents, the image generation control unit issues the instruction to generate the general-purpose images of the documents;
the image processing unit generates reduced preview images of the general-purpose images of the documents upon receiving the instruction to generate the general-purpose images from the image generation control unit;

the screen generating unit generates the job execution screen including the reduced preview images of the documents; and the display unit displays the job execution screen including the reduced preview images of the documents.

7. An image processing method comprising the steps of:

obtaining from a storage unit screen information of a home screen that displays a user interface component list including an application user interface component for accessing an application, the user interface component list including a macro user interface component for accessing a macro that includes a. setting value pre-registered in the application;

generating the home screen based on the obtained screen information;

displaying the generated home screen;

issuing an instruction to generate a general-purpose image when a request for scanning a document is issued while the home screen is displayed;

generating the general-purpose image from image data obtained from scanning the document when the instruction to generate the general-purpose image is issued;

determining whether the scanning of the document has started when the macro user interface component is selected;

generating a macro preview image from the general-purpose image when the determining indicates that the scanning of the document has started, the macro preview image representing an edited image resulting from applying the setting value of the macro; and displaying an operation screen of the application that designates the setting value of the macro when the determining indicates that the scanning of the document has not started.

8. A non-transitory computer-readable medium having a program stored thereon that is executable by a computer to cause the computer to execute an image-processing method comprising the steps of:

obtaining from a storage unit screen information of a home screen that displays a user interface component list including an application user interface component for accessing an application the user interface component list including a macro user interface component for accessing a macro that includes a setting value pre-registered in the application;

generating the home screen based on the obtained screen information;

displaying t he generated home screen;

issuing an instruction to generate a general-purpose image when a request for scanning a document is issued While the home screen is displayed;

generating the general-purpose image from image data obtained from scanning the document when the instruction to generate the general-purpose image is issued:

determining whether the scanning of the document has started When the macro user interface component is selected;

generating a macro preview image from the general-purpose image when the determining indicates that the scanning of the document has started, the macro preview image representing an edited image resulting from applying the setting value of the macro; and displaying an operation screen of the application that designates the setting value of the macro when the determining indicates that the scanning of the document has not started.

* * * * *